United States Patent [19]

Clough et al.

[11] Patent Number: 5,296,007
[45] Date of Patent: Mar. 22, 1994

[54] PROCESS FOR REMOVING SULFUR FROM COAL

[75] Inventors: Thomas J. Clough, Santa Monica; John W. Sibert, Malibu, both of Calif.

[73] Assignee: ENSCI Inc., Pismo Beach, Calif.

[21] Appl. No.: 982,077

[22] Filed: Nov. 24, 1992

Related U.S. Application Data

[63] Continuation-in-part of Ser. No. 445,041, Oct. 4, 1989, abandoned, which is a continuation-in-part of Ser. No. 931,246, Nov. 17, 1986, abandoned.

[51] Int. Cl.$^5$ ............................ C10L 9/00; C10L 9/02
[52] U.S. Cl. ...................................... 44/623; 44/624; 44/625
[58] Field of Search ........................... 44/624, 625, 623

[56] References Cited

U.S. PATENT DOCUMENTS

| | | |
|---|---|---|
| 4,022,588 | 5/1977 | Dessau . |
| 4,097,244 | 6/1978 | Burk, Jr. .................................. 44/625 |
| 4,105,416 | 8/1978 | Burk, Jr. et al. . |
| 4,158,548 | 6/1979 | Burk, Jr. et al. . |
| 4,206,288 | 6/1980 | Detz et al. . |
| 4,305,726 | 12/1981 | Brown, Jr. . |
| 4,491,454 | 1/1985 | Lompa-Krzymien . |
| 4,522,626 | 6/1985 | Espenscheid ........................ 44/625 |

FOREIGN PATENT DOCUMENTS 2031020A  4/1980 United Kingdom .

*Primary Examiner*—Asok Pal
*Attorney, Agent, or Firm*—Frank J. Uxa, Jr.

[57] ABSTRACT

A process for reducing the sulfur content of coal containing pyritic and organic sulfur comprising: contacting the coal with less than the molar stoichiometric amount of at least one +5 vanadium component and at least one reducible manganese component at selected conditions effective to oxidize at least a portion of the sulfur in the coal; reducing the sulfur content of the oxidized sulfur-containing coal; and recovering a coal product having a reduced sulfur content.

In another embodiment, the process involves the use of certain plant derived ortho-quinone containing components, in particular, certain lignin and/or tannin derived components containing ortho-quinone functionality, to oxidize at least a portion of at least one of the pyritic and organic sulfur materials in the coal.

Preferred compositions comprise at least one ligno sulfonate component containing ortho-quinone functionality. In the process, the use of at least one additional oxidant capable for maintaining the ortho-quinone containing functionality in the desired oxidation state provides for integrated process synergy.

20 Claims, No Drawings

PROCESS FOR REMOVING SULFUR FROM COAL

This application is a continuation in part of application Ser. No. 445,041 filed Dec. 4, 1989, which application is a continuation-in-part of application Ser. No. 931,246, filed Nov. 17, 1986, now abandoned.

This invention relates to a process for reducing the sulfur content of coal. More particularly, this invention relates to a process for reducing the sulfur content of coal which involves selectively oxidizing the sulfur components in coal.

The problem of air pollution due to the emission of sulfur oxides when sulfur-containing fuels are burned has received increasing attention in recent years. It is now widely recognized that sulfur oxides can be particularly harmful pollutants since they can combine with moisture to form corrosive acidic compositions which can be harmful and/or toxic to living organisms in very low concentrations.

Coal is an important fuel, and large amounts are burned, for example, in thermal generating plants primarily for conversion into electrical energy. One of the principal drawbacks in the use of coal as fuel is that many coals contain amounts of sulfur which generate unacceptable amounts of sulfur oxides on burning. For example, coal combustion is by far the largest single source of sulfur dioxide pollution in the United States at present.

The sulfur content of coal, nearly all of which is emitted as sulfur oxides during combustion, is present in essentially two forms: inorganic, primarily metal pyrites, hereinafter referred to pyritic sulfur; and organic sulfur. The pyritic sulfur is mainly iron pyrites and metal sulfates. The organic sulfur may be in the form of thiols, sulfides, disulfides and thiophenes chemically associated with the coal structure itself. Depending on the particular coal, the sulfur content can be primarily in the form of either pyritic sulfur or organic sulfur. Distribution between the two forms varies widely among various coals. For example, both Appalachian and Eastern interior coals are known to be rich in pyritic and organic sulfur. Generally, the pyritic sulfur represents from about 25% to 70% of the total sulfur content in these coals.

Heretofore, it was recognized that it would be highly desirable to remove (or at least reduce) the sulfur content of coal prior to combustion. In this regard, a number of processes have been suggested for reducing the pyritic sulfur in coal.

For example, it is known that at least some pyritic sulfur can be physically removed from coal by grinding the coal, and subjecting the ground coal to froth flotation or washing processes. While such processes can desirably remove some pyritic sulfur and ash from the coal, these processes are not fully satisfactory because a significant portion of the pyritic sulfur is not removed. Attempts to increase the portion of pyritic sulfur removed have not been successful because these processes are not sufficiently selective. Because the process is not sufficiently selective, attempts to increase pyritic sulfur removal can result in a large portion of coal being discarded along with ash and pyritic sulfur. Organic sulfur cannot be effectively physically removed from coal.

There have been suggestions heretofore to chemically remove pyritic sulfur from coal. For example, U.S. Pat. No. 3,768,988 to Meyers, issued Oct. 30, 1973, discloses a process for reducing the pyritic sulfur content of coal involving exposing coal particles to a solution of ferric chloride. The patent suggests that in this process ferric chloride reacts with pyritic sulfur to provide free sulfur according to the following reaction process:

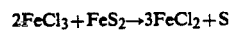

$$2FeCl_3 + FeS_2 \rightarrow 3FeCl_2 + S$$

While this process is of interest for removing pyritic sulfur, a disadvantage of the process is that the liberated sulfur solids must then be separated from the coal solids. Processes involving froth flotation, vaporization and solvent extraction are proposed to separate the sulfur solids. All of these proposals, however, inherently represent a second discrete process step with its attendant problems and cost which must be employed to remove the sulfur from coal. In addition, this process is notably deficient in that it cannot remove organic sulfur from coal.

In another approach, U.S. Pat. No. 3,824,084 to Dillon issued Jul. 16, 1974, discloses a process involving grinding coal containing pyritic sulfur in the presence of water to form a slurry, and then heating the slurry under pressure in the presence of oxygen. The patent discloses that under these conditions the pyritic sulfur (for example, $FeS_2$) can react to form ferrous sulfate and sulfuric acid which can further react to form ferric sulfate. The patent discloses that typical reaction equations for the process at the conditions specified are as follows:

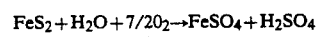
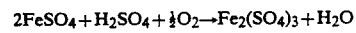

$$FeS_2 + H_2O + 7/2 O_2 \rightarrow FeSO_4 + H_2SO_4$$

$$2FeSO_4 + H_2SO_4 + \tfrac{1}{2}O_2 \rightarrow Fe_2(SO_4)_3 + H_2O$$

These reaction equations indicate that in this particular process the pyritic sulfur content continues to be associated with the iron as sulfate. While it apparently does not always occur, a disadvantage of this is that insoluble material, basic ferric sulfate, can be formed. When this occurs, a discrete separate separation procedure must be employed to remove this solid material from the coal solids to adequately reduce sulfur content. Several other factors detract from the desirability of this process. The oxidation of sulfur in the process does not proceed at a rapid rate, thereby limiting output for a given processing capacity. In addition, the oxidation process is not highly selective such that considerable amounts of coal itself can be oxidized. This is undesirable, of course, since the amount and/or heating value of the coal recovered from the process is decreased. The patent makes no claim that the process can remove organic sulfur from coal.

Numerous other methods have been proposed for reducing the pyritic sulfur content of coal. For example, U.S. Pat. No. 3,938,966, to Kindig et al, issued Feb. 17, 1976, discloses treating coal with iron carbonyl to enhance the magnetic susceptibility of iron pyrites to permit removal with magnets. This process is clearly directed to removing only pyritic sulfur from coal.

Many of the prior art processes are effective to remove the "coarse" pyritic sulfur from the coal. However, in a large number of these processes "fine" pyritic sulfur remains with the coal and can result in sulfur oxide emissions when the coal is burned. By "fine" pyritic sulfur is meant to include such sulfur which is disseminated in and/or an integral part of the coal particles. Prior attempts to remove this fine pyritic sulfur have often resulted in destroying, e.g., oxidizing, combusting or discarding a large portion of the coal itself. Clearly a more selective process for removing pyritic sulfur, and in particular fine pyritic sulfur, would be advantageous.

In a number of other recent patents, processes have been disclosed which reduce the content of both pyritic and organic sulfur in coal. For example, U.S. Pat. No. 4,249,910 to Masologites, et al, issued Feb. 10, 1981, discloses the use of certain conditioning agents to modify or alter the existing surface characteristics of iron pyrite mineral matter contained in coal particles. This surface alteration or modification provides for effective separation of the coal particles from at least a portion of the pyritic sulfur. Organic sulfur removal can also be enhanced by employing these conditioning agents. In U.S. Pat. No. 4,097,244 to Burk, Jr. et al, issued Jun. 27, 1973 and 4,105,416 to Burk, Jr. et al, issued Aug. 8, 1978, processes for reducing the sulfur content of coal are disclosed which involve contacting coal particles with an aqueous solution of iron complexing agent, and an oxidant, preferably at elevated temperatures, to preferentially oxidize at least a portion of the sulfur in the coal. The oxidized sulfur-containing coal is thermally treated, contacted with base or contacted with hydrogen donor material to transfer hydrogen to the coal and coal products of reduced sulfur content are recovered. The elevated temperatures, which are employed to accelerate the oxidation of sulfur, can be disadvantageous because of resulting losses in selectivity and/or high equipment and operating costs.

In summary, while the problem of reducing the sulfur content of coal, petroleum and petroleum fractions has received much attention, there still exists a present need for a more effective process to reduce the sulfur content of such materials.

Therefore, one object of the present invention is to provide a process for reducing the sulfur content of coal.

Another object of this invention is to provide a process for reducing the sulfur content of coal containing pyritic sulfur.

An additional object of the present invention is to provide a process for reducing the sulfur content of coal containing pyritic and organic sulfur.

An improved process for reducing the sulfur content of coal has been discovered. In one broad aspect, the process comprises: contacting coal which contains metal pyrites with at least one vanadium component in which the vanadium is present in a less than the molar stoichiometric amount and in the +5 oxidation state effective to promote the oxidation of the metal pyrites in the coal and in the presence of at least one reducible manganese component at conditions, preferably including a temperature of up to about 100° C. or higher, preferably in the range of about 20° C. to about 60° C., still more preferably about 20° C. to about 35° C. (e.g., ambient temperature), effective to oxidize at least a portion of the metal pyrites in the coal; reducing the sulfur content in the oxidized sulfur-containing coal; and recovering a coal product having a reduced sulfur content. Temperatures higher than 100° C. are not preferred due to the need for pressurized vessels.

In another broad aspect, the process comprises contacting coal containing metal pyrites and organic sulfur with at least one vanadium component in which the vanadium is present in a less than the molar stoichiometric amount and in the +5 oxidation state effective to promote the oxidation of the metal pyrites and/or organic sulfur in the coal and in the presence of at least one reducible manganese component at conditions effective to oxidize at least a portion of the metal pyrites and the organic sulfur; reducing the sulfur content in the oxidized sulfur-containing coal; and recovering a coal product having reduced pyritic sulfur and organic sulfur contents. In one embodiment, the contacting occurs in the presence of added acidophilic bacteria in an amount effective to facilitate the oxidation of the metal pyrites and organic sulfur in the coal. In another embodiment, the contacting occurs in the presence of at least one added copper component in which copper is in the +2 oxidation state and is present in an amount effective to promote the oxidation of at least a portion of the metal pyrites and/or the organic sulfur in the coal. These two embodiments, i.e., the use of acidophilic bacteria and copper +2, can be employed separately or together, e.g., in the same contacting zone.

The present process provides substantial advantages. For example, the reducible manganese component, hereinafter referred to as RMC, has been found to be effective, and is present in an amount effective, to provide at least one of the following: (A) maintain the vanadium component, e.g., in the desired +5 oxidation state, and (B) produce, e.g., oxidize, at least a portion of the vanadium component, e.g., to the desired +5 oxidation state, even at relatively mild conditions, e.g., at temperatures of less than about 100° C. Without wishing to limit the invention to any particular theory of operation, the RMC is believed to play only a limited role, if any role at all, as a direct oxidant of the metal pyrites and/or organic sulfur in the coal. The RMC acts through the +5 vanadium component, which is present in a less than the molar stoichiometric amount, e.g., a catalytic amount, resulting in the oxidation of metal pyrites and/or organic sulfur. The +5 vanadium component is preferably present in such a minor amount so that without the RMC the degree or extent of metal pyrite and/or organic sulfur oxidation would not be significant, e.g., would not result in meaningful coal desulfurization. The use of acidophilic bacteria and/or copper +2 in combination with the +5 vanadium and the RMC facilitates or promotes oxidation, in particular organic sulfur oxidation. The present process provides for selective metal pyrites and/or organic sulfur oxidation so that the reduced sulfur coal products of the present invention include a substantial amount of the coal substrate of the original coal, i.e. the coal subjected to the +5 vanadium/RMC contacting of the present invention. The present process is particularly applicable as a "finishing" technique, i.e., a process used on coal which has previously been subjected to one or more other treatments to reduce the sulfur, in particular the pyritic sulfur, content of the coal. Thus, the present process has been found particularly effective in removing fine or disseminated metal pyrites or pyritic sulfur which remains in the coal after the coal is subjected to conventional pyritic sulfur removal processes.

In addition, in the +5 vanadium/RMC contacting step of the process of this invention, a portion of the organic sulfur preferably is apparently activated such that it is removed with the oxidized metal pyrites and becomes more amenable to removal in a further thiophenic sulfur reduction or removal step of the process.

Suitable coals which can be employed in the process of this invention include brown coal, lignite, subbituminous, bituminous (high volatile, medium volatile, and low volatile), semi-anthracite, and anthracite. Regardless of the rank of the feed coal, excellent pyritic and organic sulfur removal can be achieved by the process of this invention. Metallurgical coals, and coals which can be processed to metallurgical coals, containing sulfur in too high a content, can be particularly benefitted by the process of this invention. In addition, coal refuse from wash plants which have been used to upgrade run-of-mine coal can also be used as a source of coal. Typically, the coal content of a refuse coal will be about 25% to about 60% by weight of coal. Particularly preferred refuse coals are refuse from the washing of metallurgical coals.

The present +5 vanadium/RMC contacting step involves coal, at least one +5 vanadium component and at least one RMC. By "reducible manganese component" or "RMC" is meant a manganese component which is capable of being chemically reduced at the conditions of the present +5 vanadium/RMC contacting step. Preferably, the RMC includes manganese, more preferably a major amount of manganese, in the +4 oxidation state. One particularly preferred RMC is manganese dioxide, i.e., $MnO_2$. The RMC can be provided from any suitable source. The manganese component originally present may be subjected to oxidation, e.g., by contact with air and/or other manganese oxidant, in order to obtain the presently useful RMC. One particularly useful source of RMC is manganese ores, more particularly such ores which include more than about 50%, still more particularly more than about 65%, by weight of $MnO_2$. Included are manganese ores from Imini mine, Morocco; Moanda mine, Gabon; Kisenge, Zaire, Congo; Groote Eylandt, Australia; Amapa, Brazil; and Sylamolane, Arizona. The amount of RMC employed may vary over a wide range depending on, for example, the specific RMC being employed, the vanadium component being used, what if any additional oxidant or oxidation facilitation agent is being used, the specific coal being processed, the amount and type of sulfur present in the coal and the degree of coal desulfurization desired. Preferably, the amount of RMC included in the present +5 vanadium/RMC contacting step is in the range of about 20% to about 120% of the molar stoichiometric amount, i.e., that amount (number of moles) required to fully oxidize all the sulfur in the coal being contacted to the +4, preferably +6 and more preferably +7, oxidation state. Substantial excesses of RMC should be avoided since such excesses may result in materials separation and handling problems, and may even result in reduced recovery of coal substrate.

The present +5 vanadium/RMC contacting step involves at least one vanadium +5 component in a less than the molar stoichiometric amount, i.e., as defined herein, effective to promote the oxidation of at least a portion of the metal pyrites and/or organic sulfur in the coal. Any suitable vanadium +5 component may be employed provided that such component is capable of promoting the oxidation of the metal pyrites and/or organic sulfur in the coal at the +5 vanadium/RMC contacting conditions. One particularly preferred vanadium +5 component is vanadium pentoxide, i.e., $V_2O_5$. The +5 vanadium component may be soluble or insoluble in the aqueous composition in the presence of which the +5 vanadium/RMC contacting preferably takes place. In one embodiment, the +5 vanadium component is soluble in the aqueous composition. This feature provides substantial sulfur oxidation rate advantages. In one embodiment the +5 vanadium component is a ligand complex. The presently useful vanadium ligand complexes are preferably partial ligand complexes, i.e., not fully complexed at a ratio of ligand to vanadium which substantially reduces the redox cycling activity of the ligand complexes. This feature, i.e., active redox cycling complexes, apparently facilitates the ability of the vanadium species to rapidly cycle between oxidation states and/or to promote the desired oxidation. The mol ratio of vanadium to ligand is more preferably about 1 to about 3, still more preferably to about 2.

Any suitable ligand system may be employed. The ligands are preferably derived from the group consisting of compounds containing acetylacetonate functionality, carboxylic acid functionality (more preferably containing up to about 15 carbon atoms per molecule), poly, more preferably three, carboxylic acid functionalities, substituted carboxylic acid functionality (more preferably containing up to about 15 carbon atoms per molecule) poly, more preferably three, substituted carboxylic acid functionalities, and mixtures thereof. Particularly useful ligand systems are derived from the group consisting of compounds containing acetylacetonate functionality, citric acid functionality, tartaric acid functionality, nitrilotriacetic acid functionality and mixtures thereof and their partial salts particularly, sodium, potassium and ammonium partial salts, and partial esters and substituted derivatives thereof. Particularly preferred species are citric acid, tartaric acid and nitrilotriacetic acid and their partial salts and esters thereof as illustrated above.

The +5 vanadium concentration in the +5 vanadium/RMC contacting is preferably at least about 10 ppm., more preferably about 50 ppm. to about 1.0% and still more preferably about 100 ppm. to about 0.1%, by weight of the aqueous composition, calculated as elemental vanadium.

The coal and RMC to be contacted in the present contacting step are each preferably in the form of particles. The coal particles and RMC particles can be provided by a variety of known processes, for example, grinding or crushing. In the embodiment of the present invention in which the coal to be treated has previously been subjected to other processing, e.g., desulfurization processing, the coal particles are preferably provided as agglomerates and/or aggregates, which may be prepared as discussed hereinafter.

The particle size of the coal and RMC can vary over wide ranges. In general the particles should be sufficiently small to enhance contacting in an aqueous medium. For instance, the coal and RMC may have an average particle size of one-fourth inch in diameter or larger in some instances, and as small as minus 200 mesh (Tyler Screen) or smaller in other instances. The rate of sulfur removal is faster the smaller the particle, but this advantage must be weighed against problems associated with obtaining and handling small particles. A very suitable particle size is often minus 5 mesh, preferably minus 18 mesh on 100 mesh, as less effort is required for grinding and handling and yet the particles are sufficiently small to achieve an effective rate of sulfur removal.

The coal and RMC particles and +5 vanadium component are preferably contacted in the presence of an aqueous medium or composition, more preferably an acidic, aqueous medium or composition. The mixture, i.e., comprising coal particles, RMC particles, +5 vanadium component and aqueous medium preferably contains about 5% to about 50%, more preferably about 10% to about 30%, by weight of coal particles plus RMC particles.

Any suitable aqueous medium or composition may be employed in the present +5 vanadium/RMC contacting step. The pH of the composition preferably is acidic and may vary depending, for example, on the composition of the coal being treated, the composition of the +5 vanadium component and RMC being employed, and the presence or absence of other entities during the +5 vanadium/RMC contacting. Preferably, the pH of the aqueous, acidic composition is in the range of about 1.0 to about 5. However, if an effective amount of acidophilic bacteria, and in particular *Thiobacillus ferrooxidans*, is present during the contacting, the preferred pH of the aqueous, acidic composition is in the range of about 1.5 to about 4.5, and more preferably about 3.0 and lower. Still more preferably, if an effective amount of the acidophilic bacteria is present, the pH of the aqueous, acidic composition is in the range of about 2.0 to about 3.0, with excellent results obtained with a pH in the range of about 2.5 to about 3.0.

The pH of the aqueous composition may be adjusted or maintained during the +5 vanadium/RMC contacting step, for example, by adding acid to the aqueous composition.

The aqueous composition comprises water, preferably a major amount of water. The composition is preferably substantially free of ions and other entities which have a substantial detrimental effect on the present process. Any suitable acid or combination of acids may be included in, or added to, this composition to provide the desired acidity. For example, hydrogen halides preferably hydrogen chloride, sulfurous acid, sulfuric acid, metal salts which decompose (in the aqueous, acidic composition) to form such acids, mixtures thereof and the like may be employed. Because of cost, availability and performance considerations, sulfuric acid is preferred. Quantity and concentration of the aqueous, acidic composition may be selected in accordance with the requirements of any given coal to be treated and as may be found advantageous for any given mode applying the process in practice.

The present +5 vanadium/RMC contacting step preferably takes place at temperatures of less than about 100° C., more preferably at temperatures in the range of about 20° C. to about 60° C. These relatively mild temperatures have been found to provide selective metal pyrites and organic sulfur oxidation. Higher temperatures result in increased rates of sulfur oxidation. However, these elevated temperatures often also tend to result in substantial coal substrate oxidation, which is wasteful. A process balance as to temperature and time is made between sulfur removal and not substantially oxidizing the coal substrate. In addition, providing all the components present in the +5 vanadium/RMC contacting step at higher temperatures involves increased energy consumption and equipment costs relative to conducting the +5 vanadium/RMC contacting at the preferred temperatures.

The +5 vanadium/RMC contacting pressure and contact time may vary over wide ranges and are not narrowly critical to the present invention. Pressures from about 5 psia or less to about 1000 psia or more may be employed. Satisfactory results are achieved at pressures in the range of about atmospheric to about 100 psig and are preferred to minimize equipment requirements and costs. Contact times may vary depending, for example, on the specific +5 vanadium component, RMC and coal being contacted, the other components present during the contacting and the degree of sulfur oxidation desired. Contact times in the range of about 5 minutes or less to about 24 hours or more may be used. Preferably, the contact time is in the range of about 20 minutes to about 6 hours, more preferably about 0.5 hours to about 3 hours. During this time, agitation can be advantageously employed to enhance contacting. Known mechanical mixers can be employed.

The +5 vanadium/RMC contacting step may be carried out in any conventional manner, e.g., batchwise, semi-batchwise or continuously. Conventional equipment, such as stirred tanks, agitated or stirred autoclaves and the like, may be employed in performing this +5 vanadium/RMC contacting step.

The present +5 vanadium/RMC contacting step preferably takes place in the presence of at least one additional added oxidant. This additional oxidant acts to facilitate the oxidation of the metal pyrites and sulfur in the coal. Any suitable additional oxidant may be employed. The additional oxidant is preferably capable of at least one of (1) oxidizing the pyritic sulfur in the coal at the contacting conditions and (2) oxidizing, preferably in the presence of a promoter as herein described, at least a portion of a reduced manganese component to produce a reducible manganese component at the contacting conditions. More preferably, the additional oxidant is capable of performing both these oxidizing functions. In the event an additional oxidant is present and it is capable of oxidizing a reduced manganese component to produce a reducible manganese component, the total amount of +5 vanadium component and RMC present during the +5 vanadium/RMC contacting may be less than a stoichiometric amount.

The additional oxidant is preferably normally gaseous i.e., is a gas at ambient temperature and pressure conditions. A preferred additional oxidant is molecular oxygen. Air and air containing a reduced concentration of oxygen are very useful additional oxidants. Care should be exercised to avoid large excesses of the additional oxidant so that the coal substrate itself is not unduly oxidized and destroyed. The amount of additional oxidant employed is preferably in the range of about 5% to about 150% of that needed to oxidize by one oxidation state the total amount of sulfur present in the coal fed to the present +5 vanadium/RMC contacting step. A particularly preferred additional oxidant comprises a mixture of molecular oxygen, i.e., in the form of air or dilute oxygen air, and carbon dioxide in an amount effective to promote the molecular oxygen access to and contact with the sulfur species in the coal. The use of carbon dioxide has been found to enhance the overall selective oxidation of the sulfur in the coal. Although carbon dioxide may be used with no added additional oxidant, it is preferably employed with an added additional oxidant, and more preferably with added molecular oxygen. When used with added molecular oxygen, the carbon dioxide is preferably present in amounts in the range of about 0.1 to about 10 moles of carbon dioxide per mole of molecular oxygen.

The reducible/reduced manganese component exits the contacting zone and is separated from the coal. This manganese component can be used on a once through basis, or may be regenerated to RMC and recycled to the contacting zone. Such regeneration can be done by electrochemically oxidizing the manganese component or oxidizing manganese with molecular oxygen, preferably promoted for purposes of enhanced yield and rate, at elevated temperatures to convert the reduced manganese component to RMC.

In one embodiment, the present +5 vanadium/RMC contacting occurs in the presence of added ferric ion in an amount effective to facilitate the oxidation of the sulfur in the coal. The ferric ion may be added to the +5 vanadium/RMC contacting step separately, e.g., as $Fe_2(SO_4)_3$ and/or other compounds which produce the desired amount of ferric ion when combined with the present aqueous, preferably acidic, composition in the +5 vanadium/RMC contacting and/or generated in situ from the metal pyrites. In order to more effectively control the amount of ferric ion present and to provide improved contacting, it is preferred that the added ferric ion be combined with the aqueous, acidic composition prior to the present +5 vanadium/RMC contacting step. The amount of added ferric ion used in the present process is typically minor, when compared to the amount of coal and RMC used, and may vary depending on many factors, for example, the composition of the coal, of the +5 vanadium component and of the RMC, and the degree of pyritic sulfur oxidation desired. Preferably, the added ferric ion is present in an amount of at least about 10 ppm. (by weight) of the aqueous, acidic composition. More preferably, the added ferric ion is present in an amount in the range of about 0.01% to about 1.0% by weight of the aqueous, acidic solution.

In one embodiment, the present invention involves contacting coal containing metal pyrites and organic sulfur in the presence of at least one iron complexing agent in an amount effective to promote the oxidation of at least a portion of the metal pyrites and/or the organic sulfur in the coal.

The iron complexing agents promote selective oxidation and removal of sulfur and metal pyrites and do not have a significant adverse effect on the coal.

The specific amount of iron complexing agent employed may vary over a wide range, and depends, for example, on the sulfur content, particularly the organic sulfur content, of the coal, and the complexing agent employed. Preferably, the mole ratio of complexing agent to iron is in the range of about 0.01 to 5, more preferably about 0.5 to about 2.0. It is generally convenient to provide the iron complexing agent in combination with, preferably in solution in, the aqueous, acidic composition used in the +5 vanadium/RMC contacting step.

Suitable iron complexing agents for use in this invention are compounds which can complex ferrous and/or ferric ions, preferably ferrous ions, to enhance the oxidizing potential of the iron redox couple.

Convenient compilations providing stability constants of many complexing agents for iron are provided in Martell and Calvin, "Chemistry of the Metal Chelate Compounds", U.S. copyright 1952, and "Stability Constants of Metal-Ion Complexes", supplement No. 1, Special Publication No. 25, published by The Chemical Society, U.S. copyright 1971.

Examples of suitable iron complexing agents include the following: poly-functional amines, for example, ethylenediamine, propylene diamine, ethanol amine, glycine, and asparagine and salts thereof; phosphonic acids and phosphonic acid salts, for example, ethane-1-hydroxy-1, 1-diphosphonic acid; pyridine and substituted, chelating pyridine derivatives, for example, phenanthroline and 2,2'-bipyridyl; glyoxime and salicylaldehyde derivatives; and condensed phosphates. Especially suitable salt forms of iron complexing agents are the potassium, sodium and ammonium salts. Mixtures of complexing compounds can be very desirably employed. Particularly preferred iron complexing agents for use in the present invention are those selected from bifunctional amines, pyridine and substituted, chelating pyridine derivatives.

As will be recognized by those skilled in the art, the stability of the ferrous and ferric complexes formed will often be affected by the pH of the aqueous composition employed in the present +5 vanadium/RMC contacting step. Some stability of the complex or complexes may have to be sacrificed because of the relatively low pH of the aqueous composition during the +5 vanadium/RMC contacting. This reduced complex stability has surprisingly been found not to have an under adverse effect on coal metal pyrites/sulfur oxidation. In other words, the iron complexing agents have been found to facilitate coal sulfur oxidation even though the iron complexes formed have reduced stability. The particular pH employed can also affect the salt form of the complexing agent employed, and such iron complexing salts are complexing agents within the scope of this invention.

In one embodiment, the present +5 vanadium/RMC contacting step occurs in the presence of at least one added copper +2 component in an amount effective to oxidize, or facilitate (promote) the oxidation of, at least a portion of the metal pyrites and organic sulfur in the coal. Any suitable copper +2 component may be employed provided that such component is capable of oxidizing and/or promoting the oxidation of the metal pyrites and organic sulfur in the coal at the +5 vanadium/RMC contacting conditions. Among the particularly useful copper +2 components are copper +2 complexes with ligand such as copper +2 complexes with pyridine and with imidazole and their non-chelating derivatives, such as hydroxy, carboxyl, amino, alkyl and aryl substituents. Such copper +2 components are particularly effective when present in combination with an amount of ferric ion effective to promote oxidation of at least a portion of the metal pyrites and organic sulfur in the coal. In this embodiment, the copper +2 component acts to enhance the overall oxidation of metal pyrites. The copper +2 components can be added to the +5 vanadium/RMC contacting step and/or can be formed in situ prior to or in the course of the +5 vanadium/RMC contacting. If one or more of such components are present in the +5 vanadium/RMC contacting, the copper +2 concentration is preferably at least about 10 ppm., more preferably about 50 ppm. to about 1.0% and still more preferably about 100 ppm. to about 0.1%, by weight of the aqueous composition, calculated as elemental copper.

When copper +2 components are employed, the RMC is preferably capable of oxidizing and maintaining an effective amount of copper component to the copper +2 states at the contacting conditions.

The +5 vanadium/RMC contacting step can be conducted on a batch, semi-batch or continuous basis in one contacting zone or a plurality of contacting zones arranged in series or in parallel. Any one or more of the optional components described herein as being present in the +5 vanadium/RMC contacting may be present during all or less than all of the +5 vanadium/RMC contacting.

After the +5 vanadium/RMC contacting step, the oxidized metal pyrites and organic sulfur-containing coal is subjected to a sulfur removal step to reduce the sulfur content of the coal. Any suitable sulfur removal step or steps can be employed to remove the soluble sulfur species, typically as sulfates, resulting from the metal pyrites and the non-thiophenic type organic sulfur oxidation.

For example, the oxidized metal pyrites and organic sulfur-containing coal can be separated from the manganese component and the aqueous composition. The manganese component can be recovered, reoxidized to RMC, as described herein, and recycled to the +5 vanadium/RMC contacting zone or zones, as desired. The coal can be washed with water one or more times, preferably at temperatures within the ranges disclosed herein for the +5 vanadium/RMC contacting, to remove the soluble sulfur species from the coal. Preferably, this washing is conducted in the presence of a basic material, such as milk of lime, the other bases set forth herein and the like. This washing is preferably conducted on a substantially continuous basis, more preferably as a counter-current washing operation.

The oxidized sulfur-containing coal can be subjected to a further treatment for thiophenic sulfur reduction. The discussion below describes certain of the more suitable sulfur reduction steps for improving the ultimate liberation of thiophenic organic sulfur.

In one embodiment, this sulfur reduction is accomplished by heating the coal to an elevated temperature, preferably in the range of about 500° F. to about 700° F., preferably in the absence of oxygen (or other oxidant), for a time sufficient to reduce the sulfur content of the coal, preferably in the range of about 10 minutes to about 12 hours, more preferably from about 20 minutes to about 3 hours. Preferably, the thermal treatment involves exposing the coal to superheated steam. Alternately an aqueous slurry of oxidized sulfur-containing coal can be heated to elevated temperature. The aqueous slurry of coal which can be employed in the thermal treatment step can be comprised of widely varying amounts of coal and water. Preferably, the aqueous slurry includes about 10% to 50%, more preferably about 15% to 35%, by weight of coal.

The aqueous slurry employed in this thermal treatment step can be the mixture of coal and aqueous solution employed in the +5 vanadium/RMC contacting step of the process. Generally, however, it is preferred to separate the oxidized sulfur-containing coal particles from the aqueous solution employed in the +5 vanadium/RMC contacting step, and form an aqueous slurry for use in the thermal treating step by mixing together oxidized sulfur-containing coal particles from the +5 vanadium/RMC contacting step with water.

The oxidized sulfur-containing coal can be subjected to a base treatment for thiophenic sulfur reduction. In this base thermal treatment step, the coal in the thermal treatment step is exposed to a base, preferably an alkali or alkaline earth metal hydroxide. In the base thermal treatment step, the oxidized sulfur-containing coal, preferably as an aqueous slurry of coal and base, or in the presence of steam containing base, is heated to a temperature, preferably in the range of about 500° F. to about 700° F., preferably in the absence of oxygen (or other oxidant) for a time sufficient to reduce the sulfur content of the coal, preferably about 10 minutes to 12 hours, more preferably from about 30 minutes to 3 hours. The presence of base in the thermal treatment step is preferred in that it can enhance sulfur removal. In general, it is preferred to use an alkali metal hydroxide, preferably potassium or sodium hydroxide, although the alkaline earth metal hydroxides or oxides, for example, calcium hydroxide and calcium oxide; carbonates, for example, potassium and sodium carbonate and bicarbonate; and calcined dolomitic materials can be utilized. An amount of base should be employed which provides enhanced sulfur removal. The optimum amount will vary depending on the oxidized sulfur-containing coal. The amount of base on a mole basis is preferably at least about 2 moles base to 1 mole sulfur, more preferably about 2 moles base to about 4 moles base to 1 mole sulfur. In general, the aqueous slurry should have a pH of from 7 to 14, and preferably a pH of from 8 to 12.

In the sulfur removal step or steps of this process, a substantial portion of any remaining pyritic sulfur in the coal is removed, and most notably organic sulfur removal is obtained. While the amount of organic sulfur removal can vary significantly from one coal to another, generally significant organic sulfur removal is obtained, for example, generally from about 10 to 60%, or more, by weight, of the organic sulfur can be removed.

Coal particles of reduced sulfur content are preferably recovered. Recovery of such reduced sulfur coal particles can involve a liquid-solids separation of an aqueous coal slurry, e.g., employed in the present sulfur reduction step. Such a separation can be effected in a variety of ways. Filtering with bar sieves or screens, centrifuging or aggregation/agglomeration of coal particles with oil, as is discussed hereinafter, can be employed to separate the coal solids and water. The resulting coal product has a substantially reduced sulfur content. Preferably, this coal product is dried prior to use or storage.

Preferably, prior to the +5 vanadium/RMC contacting step of the present invention, the sulfur-containing coal is subjected to processing effective to remove a portion of the pyritic sulfur from the coal. As noted above, the present +5 vanadium/RMC contacting step is particularly effective to remove fine or disseminated pyritic sulfur from the coal. Thus, the coal may be subjected to physical and/or chemical processing to remove at least a portion of the "coarse" pyritic sulfur from the coal prior to the +5 vanadium/RMC contacting. Although a number of processing options are suitable, it is preferred that before the +5 vanadium/RMC contacting the coal, in the form of a coal particle-water slurry, be contacted with a promoting amount of at least one conditioning agent capable of modifying or altering the existing surface characteristics of the pyritic sulfur mineral matter and in many cases, ash under conditions whereby there is effected modification or alteration of at least a portion of the ash and pyritic sulfur mineral matter.

Preferably coal particles containing iron pyrite mineral matter may be contacted with a promoting amount of conditioning agent which can modify or alter the surface characteristics of these existing pyrite minerals such that pyrite becomes more amenable to separation upon coal-oil aggregation when compared to the pyritic minerals prior to conditioning. The separation of the coal particles should be effectuated during the time that the surface characteristics of the pyrite are altered or modified. This is particularly true when the conditions of contacting and/or chemical compounds present in the medium can cause realteration or remodification of the surface such as to deleteriously diminish the surface differences between pyrite mineral matter and the coal particles.

Conditioning agents useful herein include inorganic compounds which can hydrolyze in water, preferably under the conditions of use, and the hydrolyzed forms of such inorganic compounds, preferably such forms which exist in effective amounts under the condition of use. Proper pH and temperature conditions are necessary for some inorganic compounds to exist in hydrolyzed form. When this is the case, such proper conditions are employed. The inorganic compounds which are hydrolyzed or exist in hydrolyzed form under the given conditions of contacting (e.g., temperature and pH) can modify or alter the existing surface characteristics of the pyrite. Preferred inorganic compounds are those which hydrolyze to form high surface area inorganic gels in water, such as from about 5 square meters per gram to about 1000 square meters per gram.

Examples of such conditioning agents are the following:

I. Metal Oxides and Hydroxides having the formula:

$M_aO_b xH_2O$ and $M(OH)_c x H_2O$, wherein M is Al, Fe, Co, Ni, Zn, Ti, Cr, Mn, Mg, Pb, Ca, Ba, In, Sn or Sb; a, b and c are whole numbers dependent upon the ionic valence of M; and x is a whole number within the range from 0 to about 3. Preferably M is a metal selected from the group consisting of Al, Fe, Mg, Sn, Zn, Ca and Ba. These metal oxides and hydroxides are known materials. Examples of such materials are aluminum hydroxide gels in water at pH 7 to 7.5. Such compounds can be readily formed by mixing aqueous solutions of water-soluble aluminum compounds, for example, aluminum nitrate or aluminum acetate, with suitable hydroxides, for example, ammonium hydroxide. In addition, a suitable conditioning agent is formed by hydrolyzing bauxite ($Al_2O_3 xH_2O$) in alkaline medium to an alumina gel. Stannous hydroxide, ferrous hydroxide and zinc hydroxide are preferred conditioning agents. Calcium hydroxide represents another preferred conditioning agent. Calcined calcium and magnesium oxides, and their hydroxides as set forth above, are also preferred conditioning agents. Mixtures of such compounds can very suitably be employed. The compounds are preferably suitably hydrolyzed prior to contacting with coal particles in accordance with the invention.

II. Metal aluminates having the formula:

$M'_d(AlO_3)_e$ or $M'_f(AlO_2)_g$, wherein M' is Fe, Co, Ni, Zn, Mg, Pb, Ca, Ba, or Mo; and d, e, f and g are whole numbers dependent on the ionic valence of M'. Compounds wherein M' is Fe, Ca or Mg. i.e., iron, calcium and magnesium aluminates are preferred. These preferred compounds can be readily formed by mixing aqueous solutions of water-soluble calcium and magnesium compounds, for example, calcium or magnesium acetate with sodium aluminate. Mixtures of metal aluminates can very suitably be employed. The compounds are most suitably hydrolyzed prior to contacting with coal particles in accordance with the invention.

III. Aluminosilicates having the formula:

$Al_2O_3 xSiO_2$, wherein x is a number within the range from about 0.5 to about 5.0. A preferred aluminosilicate conditioning agent for use herein has the formula $Al_2O_3, 4SiO_2$. Suitably aluminosilicates for use herein can be formed by mixing together in aqueous solution a water-soluble aluminum compound, for example, aluminum acetate, and a suitable alkali metal silicate, aluminum acetate, and a suitable alkali metal silicate, for example, sodium metasilicate, preferably, in suitable stoichiometric amounts to provide preferred compounds set forth above.

IV. Metal silicates wherein the metal is calcium, magnesium, barium, iron or tin. Metal silicates can be complex mixtures of compounds containing one or more of the above-mentioned metals. Such mixtures can be quite suitable for use as conditioning agents.

Calcium and magnesium silicates and mixtures thereof are among the preferred conditioning agents of this invention.

These conditioning agents can be prepared by mixing appropriate water-soluble metal materials and alkali metal silicates together in an aqueous medium. For example, calcium and magnesium silicates, which are among the preferred conditioning agents, can be prepared by adding a water-soluble calcium and/or magnesium salt to an aqueous solution or dispersion of alkali metal silicate.

Suitable alkali metal silicates which can be used for forming the preferred conditioning agents are potassium silicates and sodium silicates. Alkali metal silicates for forming preferred calcium and magnesium conditioning agents for use herein are compounds having $SiO_2:M_2O$ formula weight ratios up to 4:1, wherein M represents an alkali metal, for example, K or Na.

Alkali metal silicate products having silica-to alkali weight ratios ($SiO_2:M_2O$) up to about 2 are water-soluble, whereas those in which the ratio is above about 2.5 exhibit less water solubility, but can be dissolved by steam under pressure to provide viscous aqueous solutions or dispersions.

The alkali metal silicates for forming preferred conditioning agents are the readily available potassium and sodium silicates having $SiO_2:M_2O$ formula weight ratios up to 2:1. Examples of specific alkali metal silicates are anhydrous $Na_2SiO_3$ (sodium metasilicate), $Na_2Si_2O_5$ (sodium disilicate), $Na_4SiO_4$ (sodium orthosilicate), $Na_6Si_2O_7$ Sodium pyrosilicate) and hydrates, for example, $Na_2SiO_3.nH_2O$ (n=5,6,8 and 9), $Na_2Si_4O_9.7H_2O$ and $Na_3HSiO_4.5H_2O$. Examples of suitable water-soluble calcium and magnesium salts are calcium nitrate, calcium hydroxide and magnesium nitrate. The calcium and magnesium salts when mixed with alkali metal silicates described hereinbefore form very suitable conditioning agents for use herein.

Calcium silicates which hydrolyze to form tobermorite gels are especially preferred conditioning agents for use in the process of the invention.

V. Inorganic Cement Materials.

Inorganic cement materials are among the preferred conditioning agents of the invention. As used herein, cement material means an inorganic substance capable of developing adhesive and cohesive properties such that the material can become attached to mineral matter. Cement materials can be discrete chemical compounds, but most often are complex mixtures of compounds. The most preferred cements (and fortunately, the most readily available cements) are those cements capable of being hydrolyzed under ambient conditions, the preferred conditions of contacting with coal in the process of this invention.

These preferred cement materials are inorganic materials which, when mixed with a selected proportion of water, form a paste that can set and harden. Cement and materials used to form cements are discussed in Kirk-Othmer, Encyclopedia of Chemical Technology, 2nd Edition, volume 4, (1964), John Wiley & Sons, Inc., Pages 684 to 710 thereof are incorporated herein by reference. Examples of cement materials include calcium silicates, calcium aluminates, calcined limestone and gypsum. Especially preferred examples of cement materials are the materials employed in hydraulic limes, natural cement, masonry cement, pozzolan cement and portland cement. Such materials will often include magnesium cations in addition to calcium, e.g., dolomite.

Commercial cement materials, which are very suitable for use herein, are generally formed by sintering calcium carbonate (as limestone), or calcium carbonate (as limestone) with aluminum silicates (as clay or shale). Preferably, such materials are hydrolyzed prior to use as conditioning agents.

With some coals, the mineral matter associated with the coal may be such that on treatment under proper conditions of temperature and pH the mineral matter can be modified in situ to provide the suitable hydrolyzed inorganic conditioning agents for carrying out the process. In such cases, additional conditioning agents may or may not be required depending on whether an effective amount of conditioning agent is generated in situ.

The conditioning agents suitable for use herein can be employed alone or in combination.

When a conditioning agent is employed, the coal particles are preferably contacted therewith in an aqueous medium by forming a mixture of the coal particles, conditioning agent and water. The mixture can be formed, for example, by grinding coal in the presence of water and adding a suitable amount of conditioning agent. Another very suitable contacting method involves forming an aqueous mix of conditioning agent, water and coal and then crushing the coal with the aqueous mix of conditioning agent, for example, in a ball mill, to particles of a suitable size. Preferably, the aqueous medium contains from about 5% to about 50%, more preferably from about 5% to about 30%, by weight of the aqueous medium of coal particles.

The coal particles are contacted for a period of time and under conditions of temperature and pressure sufficient to modify or alter the existing surface characteristics of the pyritic mineral matter sulfur in the coal such that it becomes more amenable to separation from the coal when the coal is oil-aggregated. The optimum time will depend upon the particular reaction conditions and the particular coal employed. Preferably, a time period in the range of about 1 minute to about 2 hours or more, is employed. More preferably, a time period in the range of about 10 minutes to about 1 hour is employed. During this time, agitation can be advantageously employed to enhance contacting. Known mechanical mixers, for example, can be employed.

An amount of conditioning agent is employed which is sufficient to promote the separation of pyritic sulfur and ash from coal. Preferably, the proportion of conditioning agent, based on coal, is in the range of about 0.01% to about 15%, more preferably in the range of about 0.05% to about 10% and still more preferably in the range of about 0.5% to about 5%, by weight.

Because one of the major results sought is an effective diminution in overall mineral matter content of the treated coal particles, it is usually preferred to base the dosage of conditioning agent upon the mineral matter content of the coal. Depending upon the type and source of the feed coal, the mineral matter content may vary widely and is generally in the range of about 5% to about 60%, and usually about 10% to about 40%, by weight based on the feed coal. Dosage of the conditioning agent is preferably in the range from about 0.05% to about 30%, more preferably about 0.10% to 15%, and still more preferably about 1.0% to 10%, by weight based on mineral matter.

Preferably, the coal is contacted with the conditioning agent in an aqueous medium. The contacting is carried out at a temperature such to modify or alter the pyritic surface characteristics. For example, temperatures in the range of about 0° C. to about 100° C., are preferably employed, more preferably about 20° C. to about 70° C., and still more preferably about 20° C. to about 35° C. Temperatures above 100° C. can be employed, but are not generally preferred since a pressurized vessel would be required. Temperatures in excess of 100° C. and pressures above atmospheric, generally pressures of about 5 psig. to about 500 psig, can be employed, however, and can even be preferred when a processing advantage is obtained. Elevated temperatures can also be useful if the viscosity and/or pour point of the aggregating oil employed is too high at ambient temperatures to selectively aggregate coal.

As stated above, the conditions of conditioning agent contacting are adjusted in order to effectuate the alteration or modification of the pyrite surface. During such time when the surface characteristics are altered or modified the coal particles are separated by aggregation before significant deterioration of the surface characteristics occurs.

The process step whereby the sulfur-containing coal particles are contacted with conditioning agent in aqueous medium may be carried out in any conventional manner, e.g., batchwise, semi-batchwise or continuously. Since ambient temperatures can be used, conventional equipment will be suitable.

An amount of aggregation additive, such as hydrophobic flocculating agent, including hydrocarbon oils, necessary to form coal aggregates can be present during the conditioning step. Alternatively, and preferably, after the coal particles have been contacted with the conditioning agent in aqueous solution for a sufficient time, the coal particles are aggregated with the additive. Similarly, it is preferred to aggregate/agglomerate the reduced sulfur coal particles (from the +5 vanadium/RMC contacting and sulfur reducing steps noted above) with the additive.

The hydrocarbon oil additive employed may be derived from sources such as petroleum, shale oil, tar sand or coal. Petroleum oils are generally to be preferred primarily because of their ready availability and effectiveness. Coal liquids and aromatic oils are particularly effective. Suitable petroleum oils will have a moderate viscosity, so that slurrying will not be rendered difficult, and a relatively high flash point, so that safe working conditions can be readily maintained. Such petroleum oils may be either wide-boiling range or narrow-boiling range fractions; may be paraffinic, naphthionic or aromatic; and preferably are selected from among light cycle oils, heavy cycle oils, clarified oils, gas oils, vacuum gas oils, kerosenes, light and heavy naphthas, and mixtures thereof. In some instances, decanted or asphaltic oils may be used.

As used herein "coal aggregate" means a small aggregate or floc formed of several coal particles such that the aggregate is at least about two times, preferably from about three to twenty times, the average size of the coal particles which make up the aggregate. Such small aggregates are to be distinguished from spherical agglomerates which include a large plurality of particles such that the agglomerate size is quite large and generally spherical. For example, agglomerates in the shape of balls having diameters of from about ⅛ inch to ½ inch, or larger, may be formed. Such agglomerates generally form in the presence of large proportions of oil.

When hydrocarbon is used as the additive, the oil phase is desirably added as an emulsion in water. The preferred method is to effect emulsification mechanically by the shearing action of a high-speed stirring mechanism. Such emulsions should be contacted rapidly and as an emulsion with the coal-water slurry. Where such contacting is not feasible, the use of emulsifiers to maintain oil-in-water emulsion stability may be employed, particularly non-ionic emulsifiers. In some instances, the emulsification is effected in sufficient degree by the agitation of water, hydrocarbon oil and coal particles.

In the process of this invention, it is preferred to add the hydrocarbon oil, emulsified or otherwise, to the aqueous medium of coal particles and agitate the resulting mixture to aggregate the coal particles. If necessary, the water content of the mixture can be adjusted to provide for optimum aggregation. Preferably about 50 parts to about 99 parts, more preferably about 60 parts to about 95 parts, and still more preferably about 70 parts to about 95 parts, by weight of water, based on 100 parts of the coal-water feed, is employed for aggregation. There should be sufficient hydrocarbon oil present to aggregate the coal particles, but this amount should preferably be held to the minimum amount required for a suitable degree of aggregation. The optimum amount of hydrocarbon oil will depend upon the particular hydrocarbon oil employed, as well as the size and rank of the coal particles. Preferably, the amount of hydrocarbon oil is in the range of about 1% to about 15%, more preferably about 2% to 10%, by weight, based on coal. Still more preferably the amount of hydrocarbon oil is about 3% to about 8%, by weight, based on coal.

Agitating the mixture of water, hydrocarbon oil and coal particles to form coal-oil aggregates can be suitably accomplished using stirred tanks, ball mills or other apparatus. Temperature, pressure and time of contacting may be varied over a wide range of conditions, generally including the same ranges employed in conditioning the particles. In the course of optimizing the use of oil in the aggregation step, the oil phase, whether in emulsified form or not, is preferably added in small increments until the desired total quantity of oil is present. The resulting coal-oil aggregates possess surprising structural integrity and, if broken, as by shearing, readily form again and consequently afford a new solid phase. Better overall rejection of mineral matter is effected by aggregating rather than agglomerating the conditioned coal particles than is experienced with spherical agglomerates.

In any event, after the separation step, the conditioned coal particles reduced in sulfur content may be sent to intermediate storage or directly to the present +5 vanadium/RMC contacting step.

In an additional broad aspect, a process has been discovered which comprises contacting coal containing metal pyrites and/or organic sulfur with at least one added plant derived aromatic component having ortho quinone functionality in an amount effective to at least promote the oxidation of at least one of the metal pyrites and/or organic sulfur. The contacting occurs at conditions effective to chemically oxidize at least a portion of the metal pyrites and/or organic sulfur. The coal is then recovered, having reduced pyritic sulfur and/or organic sulfur contents.

In another embodiment of the above process, the contacting occurs in the presence of an additional oxidant, more preferably a gaseous source of oxygen, e.g., air, enriched/diluted air, oxygen and the like.

In one embodiment, the plant derived aromatic containing component having ortho quinone functionality is preferably selected from a component which has one or more water solubilizing groups attached to the component more preferably as a water soluble salt such as an alkali metal salt. The plant derived aromatic containing component having ortho-quinone functionality, hereinafter referred to as ortho-quinone component, and mixtures thereof is present in an amount effective to at least promote the oxidation of the pyritic and/or organic sulfur associated with the coal, hereinafter referred to as sulfur material. The various embodiments of this invention can be practiced singly or in any combination of embodiments, with selection and optimization generally being a function of the coal type and desired coal to be recovered.

The benefits resulting from the process of this invention, e.g., improved rate of oxidation including solubilization and/or conversion to a different sulfur form, improved rate of oxidation of the sulfur material and/or yield/recovery of desired coal as a function of time, are substantial. Without wishing to limit the invention to any specific theory of operation, it is believed that many of such benefits result from the direct and/or indirect oxidation, i.e., oxidation promoting effect of one or more of the above o-quinone containing components. It is believed that the o-quinone containing components can interact directly and/or indirectly with the sulfur material by direct oxidation of the sulfur material and-/or by the generation of an active oxidant specie which interacts with the sulfur material to reduce the sulfur content of the coal.

Another embodiment of this invention is the obtaining of such benefits through a catalytic effect by the ortho-quinone containing components. Without wishing to limit the invention to any specific of operation, it is believed that the ortho-quinone containing component during its oxidation interaction with the sulfur material is reduced and is subsequently regenerated by an additional oxidant such as an active oxygen specie, such as oxygen. During a given period of time in which the coal is contacted with the ortho-quinone containing component and an additional oxidant, the ortho-quinone containing component can cycle between an oxidized and reduced state, i.e., the component is regenerated, thereby allowing the oxidation of the sulfur material to be carried out with an amount of ortho-quinone containing component less than would be required without the regeneration of such component. The use of such lesser amounts of the ortho-quinone containing component, i.e., a catalytic amount, allows for improved process efficiencies.

The promoting effect of the presently useful ortho-quinone redox couples allows the process to be effective, e.g., from the standpoint of improved recovery of lower sulfur coal as a function of time, on a wide variety of difficult to process coals.

Improved yields or recoveries of coal are often achieved under less severe conditions by practicing the present process, especially when compared to recovering lower sulfur coal without utilizing the process of this invention. The present process is relatively easy to operate and control. Relatively low concentrations of the o-quinone containing components are used and relatively mild operating conditions may be employed. With regard to higher sulfur coals, operating and capital costs are often reduced relative to previous more severe procedures which require substantial amounts of chemicals and/or expensive metallurgy to combat corrosion problems. Thus, the present invention can provide a cost effective approach to the recovery of lower sulfur coal.

The present ortho-quinone contacting process provides substantial advantages. For example, the use of at least one of certain promoting o-quinone containing components, particularly lignin and tannin derived components particularly having water solubilizing groups such as the sodium salt and more particularly in a redox cycling catalytic amount in the presence of an additional oxidant provides for improved contacting, e.g., to increase the rate of sulfur material oxidation and ultimately to improve the yield of lower sulfur coal recovered. The improved rate of sulfur material oxidation also results in significant process and cost economies. In addition, effective coal recoveries can be achieved utilizing sulfur containing coals.

The present ortho quinone contacting process employs at least one of certain o-quinone containing components. Such components may include alkali and/or alkaline earth metals and/or ammonium salts provided that they also contain o-quinone containing functionality which is effective in the present invention. Such o-quinone containing components are present during the contacting step in an amount effective to at least promote the oxidation of the sulfur material in the coal. Thus, such ortho quinone containing components are present in an amount effective to promote such oxidation and/or to oxidize the sulfur material in the coal.

The presently useful plant derived aromatic components having o-quinone functionality are preferably selected from the group consisting of one or more lignin derived components, one or more tannin derived components and mixtures thereof. The lignin and tannin derived components may be selected from natural materials or lignin and tannin containing materials from various lignin and tannin manufacturing processes. As set forth above, preferred components having ortho-quinone functionality are those that also have water solubilizing functionality particularly as a water solubilizing salt particularly at alkaline pH.

Lignin in higher plants is formed by complex enzymatic processes which produce substituted phenolic compounds. Lignins are a family of three-dimensional polymers which bind together the cellulose fibers in higher plants. Lignins can provide rigidity to the plant structure and, being in general resistant to chemical and biological attack, helps plants from decay. Lignin is distributed widely throughout the plant kingdom. Plant lignins are generally divided into three broad classes which are commonly called softwood, hardwood and grass or annual plant lignins. The latter also includes such plants as bamboo and palm. Thus lignin can be released by chemical or mechanical disintegration from a wide variety of plant tissues including, as set forth above, softwood (coniferous), hardwood (deciduous) or from bark, cambium, sapwood or heartwood. In addition, lignin can be released from jute, rice hulls, peanut shells, barley, straw, begasse, coconut shells, alfalfa, pine needles, oat and wheat straw, corn cobs and various other plant materials.

Although the exact structure of lignin is unknown, plant lignins from certain trees are considered to be a polymeric material almost entirely made up of phenylpropane units that exist as branched chains of cross-linked structures. In lignin from softwood trees, nearly all the aromatic rings have one methoxyl group in position three from the propyl side chain.

The phenolic precursors of hardwood lignin trees contain methoxyl groups in one or both of the positions adjacent to the phenolic hydroxyl; however, in softwoods the precursors are generally substituted at only one position and occasionally not at all. As a result of this softwood lignin contains about twice as many reactive sites on the aromatic rings and contain a higher proportion of carbon-carbon linkages between aromatic rings. A chemical structure which incorporates various chemical groupings found in, for example, spruce native lignin in their existing ratios shows various joined coniferyl units with approximately one-third of the units still having a free phenolic group and most having an aliphatic alcohol group in the side chain. A majority of the phenolic groups are generally in etherified form, i.e., a phenolic polyether, and have a number average molecular weight of generally about 2000 to about 10,000.

There are two major pulping processes which promote lignin solubility, each using a different approach. In sulfite processes, the lignin molecule is attacked by sulfonate anions generally in the presence of sodium, ammonium, magnesium or calcium cations and at varying pH values to produce a range of pulps with varying lignin and hemicellulose contents. The lignin molecule in this process becomes sulfonated and thus water soluble. Alternatively, in alkaline processes, the lignin molecule is depolymerized by alkaline hydrolysis of the ether bonds between the aromatic units.

Lignosulfonate products are generally produced from wood by the acid bisulfite pulping process and the kraft process. In the acid sulfite pulping process, the lignin in, for example, wood chips is subjected to reaction with an aqueous bisulfite salt at elevated temperature and pressure. During the process, the lignin is rendered water-soluble by a combination of depolymerization and sulfonation. Both cleavage and sulfonation occur almost entirely at positions immediately adjacent to the aromatic rings. Cleavage of this carbon-oxygen bond destroys one of the linkages common to both hardwood and softwood lignin.

The resulting lignin sulfonate is dissolved in the spent sulfite pulping liquor along with a variety of carbohydrate compounds which are primarily formed by degradation of the hemicellulose components of wood. The chemical composition of hemicellulose varies considerably with species of tree, even within the general categories of hardwoods and softwoods. The degradation products, therefore, also vary widely and can include glucose, mannose, galactose, xylose, arabinose and rhamnose in proportions which are determined largely by the wood source. These sugars usually account for 20-25% of the total spent sulfite liquor solids. In addition, ash can be present in the liquor solids.

In sulfite pulping, generally up to about one-half of the coniferyl building units of the lignin molecule add sulfonate groups with varying ease. The locations of the attacks are generally the highly active benzyl alcohol or benzyl ether groups of the lignin. These oxygen containing groupings on the carbon adjacent to the aromatic ring are very labile and are substituted in the pulping process by the highly polar sulfonate groups. If the benzyl alcohol or ether is attached to a free phenolic unit, a sulfonate group is more readily introduced than when the benzyl group is attached to a phenol ether. Sulfonation apparently also occurs on side chain carbons adjacent to carbonyl groups. Thus, through addition of solvating groups to the high polymer lignin and through low order acid hydrolysis and splitting of the lignin molecule, solution of the lignin is achieved.

Lignosulfonates are generally classified as polydisperse macromolecular polymers with molecular weights ranging from several hundred to more than one hundred thousand. The phenylpropane structural units of lignosulfonates can be linked together in many different patterns by carbon-carbon and ether linkages. Most of the sulfonate groups in lignosulfonates are thought to be joined to the alpha carbons of the side chain, with about one sulfonate radical for two phenylpropane units. Primary hydroxyl groups are found on many of the phenylpropane units while others have various carbonyl groups.

Lignosulfonates from the sulfite process can generally have a weight average molecular weight up to about 100,000. The calcium lignosulfonate can be used as starting materials for other products due to the ease with which the calcium cation may be replaced with other cations to form the appropriate soluble sulfate salts, such as sodium, ammonium and potassium.

The other basic process to solubilize lignin is the alkaline pulping processes. The most predominate lignin interlinkage is the beta ether type, and this is cleaved by alkali to form smaller molecular size phenols which tend to dissolve in water as the sodium phenolate salts. In phenyl coumarin type interlinkages, alkali attack frees the phenolic group for solubilizing salt formation, but concurrent formaldehyde loss from the side chain can produce a double bond between the two benzene rings to form phenolic stilbene portions in the alkali lignin.

In the kraft process, pulping liquor which contains from about 20 to about 30 wt % sodium sulfide in a mixture with sodium hydroxide is used. Whereas, sodium hydroxide alone will depolymerize the lignin to soluble form, the hydroxide can also split the ether groups of the wood carbohydrates causing their undesired dissolution. A sodium hydroxide-sodium sulfite mixture is generally more effective in achieving continued lignin dissolution while having comparable effects on the carbohydrate dissolution. Apparently, sulfide not only promotes more rapid splitting of the lignin ether groups, but introduction of sulfur in the benzyl alcohol position may inhibit concurrent polymerizing reactions.

The location of the alkaline attack on the native lignin generally results in the ether groups being split to form smaller molecular size free phenols. Typically about 5 to 10% of the lignin can be decomposed all the way down to monomeric phenols in the liquor, while the remainder is solubilized as higher molecular weight portions of the gross lignin molecule. The potential ether split and loss of formaldehyde can produce stilbene type structures. Comparable dehydration and formaldehyde loss can produce unsaturated ethers. In addition, carboxyl groups are also found in kraft lignin.

In alkaline hydrolysis, the phenolic group in the lignin molecule are generally doubled so that they are present on a majority of the units.

By proper two-stage acidification, coagulation and purification, there can be obtained a reproducible kraft lignin from pine black liquor with a structure and number average molecular weight approximately about 2000 to about 12,000 and a weight average molecular weight of about 2500 to about 10,000. Based upon the mode of alkaline attack, a generalized structure can be designated as a plurality of aromatic units as polyelectrolyte with phenolic groups, carboxyl groups, keto groups, aliphatic hydroxyl, and double bonds.

The processed lignin can be further processed to modify various properties of the lignin such as solubility in an aqueous medium, for example, by substituent group modifications such as sulfonic, hydroxyl, polyhydroxyl and further reactions with polyhydroxy aromatic compounds, particularly catechol containing compounds. Such modifications, including examples as set forth above, are included within the scope of this invention.

Lignin derived products can undergo physical and chemical modification by modification of sulfite liquor, sulfonated lignin, and kraft lignin. Depending on the optimum properties required, lignin derived products, including lignosulfonates, can be processed by one or more methods including conversion to other salts, polymerization, classification of molecular weights, and oxidation-reduction of macromolecules. The solubility, absorption, electrolytic, and complexing characteristics of such products can be modified based upon their molecular structure shape and size, i.e., the type, quantity and location of functional groups including sulfonic, sulfonate, sodium sulfonate, hydroxyl, poly hydroxy including di hydroxy benzene such as catechol, carbonyl, methoxy, carboxyl and chloride.

As set forth above, the preferred lignin derived products having ortho-quinone functionality are those having water solubilizing groups, particularly sulfonate, carboxylate, phenolate groups and the like which enhance the solubility characteristics of such components particularly at alkaline pH. In addition, it is preferred to optimize the amount of ortho-quinone functionality in the lignin containing component, preferably during processing such as during the sulfite or kraft pulping process. During such processing, catechol functionality is believed to be introduced by demethylation during the depolymerization and/or hydrolysis and other reactions of the lignin raw material. The formation of catechol functionality is believed to be enhanced by both temperature and alkaline pH particularly at increased process severities. As set forth above, the lignin containing component can be further reacted to enhance the formation of catechol functionality. The catechol functionality can be converted to the ortho-quinone functionality using, for example, an active oxygen species, such as oxygen. As used herein, the term plant derived aromatic containing components includes both components having ortho-quinone functionality and/or catechol functionality which can be converted to ortho quinone functionality, preferably under the in situ and external regeneration process conditions of this invention. In addition, various substituent groups can be introduced onto the catechol functionality group in order to modify the oxidation potential and regeneration of the reduced ortho-quinone functionality for overall effectiveness in the treatment of coal. In general, substituents on the quinone nucleus such as halogens particularly chloride, CN, $SO_3Na$ in general raise the potential of the ortho-quinone functionality, whereas alkyl, i.e., methyl, methoxy, hydroxy, and various amine and alkyl substituted amine groups in general decrease the oxidation potential. As set forth above, the optimum oxidation potential and the oxidizing power of the ortho-quinone component is a function of the sulfur type and content of the coal, the process conditions particularly the pH, and the regeneration of the ortho-quinone component, whether such regeneration be in situ such as when the ortho-quinone component is utilized in catalytic amounts or when larger amounts of the ortho-quinone component are utilized. The ortho-quinone component can be regenerated, for example, externally and recycled to the process. In general, it is preferred to have an oxidation potential of the ortho-quinone functionality which allows for reasonable process efficiencies, i.e., oxidation of the sulfur material in the coal, so as to improve overall coal sulfur reduction and to provide ease of regeneration for the continued oxidation of the sulfur material of the coal in situ and/or external regeneration.

Typical examples of lignin derived products which are suitable to provide the o-quinone oxidants of this invention are, for example, the treated or untreated spent liquors (i.e., containing the desired effluent lignin product solids) obtained from wood or other plant conversion, for example, the waste pulp liquor, or modified lignin products, such as by pyrolysis, reduction modification or ozonation of the aforementioned lignin individual products including spent liquors. The alkaline oxidized, hydrolyzed, partially desulfonated and subsequently resulfonated lignosulfonates are also suitable.

Certain of these lignin containing components are obtained in waste pulping liquors derived from softwood and hardwood starting materials. Lignin containing components may be additionally sulfonated or sulfomethylated.

Other lignin containing products are the ozonated lignosulfonates obtained from ozonation of the aforementioned ligno products, including treated or untreated spent liquors. In addition, purified lignin containing products from which the sugars and other saccharide constituents have been partially or totally removed such as by fermentation or, additionally, inorganic constituents have also been partially or totally removed are also useful.

As a further alternative, the lignin containing components may be one of the desulfonated lignosulfonates (including substantially pure lignosulfonate compositions) which are generally obtained by catalytic—frequently alkaline—oxidation processes conducted under conditions of high temperature and pressure, oftentimes with accompanying hydrolysis.

As set forth above, further modification of the lignin derived products are included within the scope of this invention and include the reaction of the foregoing lignin containing product materials with, for example, a halide, a halocarboxlyic acid or a sulfonating agent. In addition, further reactions can include one or more combinations of alkoxylation, sulfation, alkoxysulfation, alkylation or sulfomethylation. Any suitable sulfonation reagents may be used for sulfonation reaction. When straight sulfonation is desired, it is advantageously accomplished with an alkali metal (such as sodium) sulfite or sulfur dioxide. Sulfoalkylation can be accomplished with mixtures of an appropriate lower alkyl aldehyde and a bisulfite.

Other lignin containing compounds which may be used in the practice of this invention are the derivatives of an oxidized, partially desulfonated lignosulfonate obtained in the spent oxidized liquor from a dilute vanillin oxidized softwood or hardwood, spent sulfite liquor by acidification prior to vanillin extraction with an organic solvent and which can be further treated with, for example, sodium bisulfite and an aldehyde, preferably formaldehyde, at elevated temperature to sulfoalkylate, and/or sulfomethlate, the desulfonated lignosulfonate molecules.

Tannins occur in many plants and are in general separated by extraction. A typical example of tannin compound includes tree bark extract such as quebracho, hemlock and redwood extracts. The tannins are aromatic and are obtained from various plants and trees. Particularly preferred tannins are the condensed tannins which have catechol functionality, i.e., the catechol tannins which can generate and/or be converted to ortho-quinone functionality.

As set forth above, the activity (regeneration) of the o-quinone containing component can be affected by the pH of the aqueous composition employed in the present contacting step. Some activity of the o-quinone component may have to be sacrificed because of the pH of the aqueous composition during the contacting, which pH may be preferred for various other processing reasons. The particular pH employed can also affect the salt form of the o-quinone containing component employed, and such salts are o-quinone containing components within the scope of this invention.

As set forth above, the ortho-quinone containing components are effective in a catalytic and/or promoting amount, particularly in the presence of an additional active oxidant species such as oxygen, and such combination of component plus additional oxidant allows the ortho-quinone containing component to cycle between an ortho-quinone functionality and a reduced catechol functionality. Thus, the ortho-quinone containing component can interact with the sulfur material of the coal followed by regeneration, i.e., reoxidation of the catechol functionality. After regeneration, the ortho-quinone functionality can further interact with the sulfur material of the coal. Thus the ability to rapidly cycle between the ortho-quinone and catechol states produces a cycling component which can oxidize and be regenerated, thereby producing a series of oxidations/regenerations during contacting of the coal. As set forth above, the ortho-quinone containing component can be modified such as through substituent groups on the aromatic ring to optimize activity for both oxidation and regeneration, i.e., effective oxidation of the sulfur material with effective regeneration, preferably rapid regeneration. The optimization provides for overall improved process effectiveness. Thus substituant groups such as methoxy, sulfonate, hydroxy, chloride and cyanide can be used to modify and enhance the overall oxidation regeneration effectiveness of the ortho-quinone containing components. Thus, it is preferred that the ortho-quinone containing component cycle rapidly and produce a number of cycles, for example at least about 4 cycles and generally from about 5 cycles up to about 1000 cycles or more or up to about 100 cycles, the number of cycles in general being such number which effectively allows for an improvement in lower sulfur recovery. The number of cycles in general will be a function of the sulfur content and type of the coal, the concentration of the ortho-quinone containing component, as well as other impurities and components in the coal which may be susceptible to oxidation. By the term "cycle" is meant a single oxidation regeneration cycle, commonly referred to in promoter catalyst terms as "one turnover."

The specific amount of the o-quinone containing component employed may vary over a wide range and depends, for example, on the coal and/or the o-quinone containing component employed, and on the degree of oxidation desired. The weight percent of o-quinone functionality, based upon the molecular weight of the ortho-quinone component, can vary over a wide range and in general represents a weight percent of from at least about 1 weight percent to about 40 weight percent of the weight of the ortho-quinone containing component, i.e., for those compounds containing ortho-quinone functionality, more preferably from at least about 2 to about 30 weight percent and still more preferably from at least about 5 weight percent to about 25 weight percent. By ortho-quinone functionality is meant an ortho-quinone functionality having a molecular weight of about 108 and the relationship of that molecular weight from a weight percent standpoint to the total molecular weight of the compound. For example, for certain components the total molecular weight can be represented by the total molecular weight of the phenyl propane units, including substituents or such phenyl propane units. Since the ortho-quinone containing components in general will be mixtures, the above preferred ranges apply to the individual ortho-quinone containing components within the mixture. Preferred molecular weight ranges are from about 1500 to about 75,000, more preferably from about 2000 to about 10,000 and still more preferably from about 2000 to about 6000.

In certain embodiments, preferred concentrations of the ortho-quinone containing component are in the range of about 0.05 to about 3%, more preferably from about 0.1 to about 2% be weight based upon the aqueous composition employed in the contacting, calculated as o-quinone containing component. It is generally convenient to provide the o-quinone containing compound in combination with, preferably in solution in, the aqueous composition used in the contacting step. As set forth above, it is preferred that the ortho-quinone containing component be present in an effective catalytic and/or promoting amount, particularly within the ranges set forth above. In addition, as set forth above, it is preferred that the ortho-quinone containing component be water soluble at the concentration and conditions at which it is effective for carrying out the process of this invention.

The o-quinone containing component can be added to the contacting step and/or can be formed in situ prior to or in the course of the contacting.

The present contacting preferably takes place in the presence of an aqueous liquid medium or composition. The ortho-quinone containing component, which is preferably soluble in the aqueous medium, may be added to the aqueous medium prior to the contacting. Any suitable, aqueous medium can be employed in the present process, including salt solutions, preferably sodium chloride. The pH of the aqueous medium may vary and in general a neutral or basic medium, preferably a basic or alkaline medium can be employed depending, for example, on the composition of the coals being treated, the specific ortho-quinone containing component being employed, and the presence or absence of other components or entities such as soluble metals during the contacting. Preferably, the pH of the aqueous composition is in the range of about 7 to about 13, preferably from about 9 to about 13 and, still more preferably, from about 10 to about 12. The pH of the aqueous medium may be adjusted or maintained, e.g., during the contacting step, for example, by adding acid and/or base.

The aqueous medium comprises water, preferably a major amount of water. The medium is preferably substantially free of ions and other entities which have a substantial detrimental effect on the present process. Any suitable acid and/or base or combination of acids and/or bases may be included in, or added to, the medium to provide the desired pH. For example, hydrogen halides, preferably hydrogen chloride, sulfurous acid, sulfuric acid, metal salts which decompose (in the aqueous medium) to form such acids, alkali metal hydroxides, for example, sodium and potassium, alkaline earth metal hydroxides, ammonium hydroxide, metal salts which decompose (in the aqueous medium) to form such bases, their corresponding carbonates, preferably sodium carbonate, mixtures thereof and the like may be employed. It is preferred to use an hydroxide as the base, preferably sodium hydroxide. The quantity and composition of the aqueous medium may be selected in accordance with the requirements of any given coal to be treated and as may be found advantageous for any given mode applying the present process in practice. In carrying out the present process, one or more wetting agents and/or sulfur dispersion agents and/or metal catalysts can be included in, e.g., added to, the aqueous composition (in addition to the ortho-quinone containing components) to further enhance rates and/or yields. Examples of such agents include hydrocarbon sulfonates, lignosulfonates, alkyl substituted succinic anhydrides, alcohol ethoxylates and the like. Typical examples of metal oxidation catalysts are iron, copper, cobalt, vanadium, and manganese components which are soluble in catalytically effective amounts in an aqueous medium, preferably selected from iron complexes with ligands, copper complexes with ligands, vanadium components with ligands, manganese components with ligands, and mixtures thereof.

The amount of ortho-quinone containing components employed may vary widely provided that such amount is effective to function as described herein. Such ortho-quinone containing components are preferably present during said contacting in an amount less than about 5%, more preferably in the range of about 0.05% to about 3% by weight, and still more preferably from about 0.1% to about 2%, calculated as o-quinone containing material, based on the amount of coal present and/or liquid present during contacting such as a solution used in an agitated process. One of the substantial advantages of the present process is that large amounts of ortho-quinone containing components are not required although adjustments can be made depending on the sulfur concentration in the coal. Thus, in order to reduce costs still further while achieving benefits of the present invention, low concentrations of such materials are preferably selected.

The present contacting is preferably conducted in the presence of at least one additional active oxidant species other than the ortho-quinone containing component. The oxidant is present in an amount effective to do at least one of the following: maintain or form the ortho-quinone containing component, produce or regenerate at least a portion of the ortho-quinone containing component, and/or oxidize at least a portion of the sulfur material in the coal. The oxidant or oxidants may be present during the contacting step and/or during a separate step to form and/or regenerate the ortho-quinone containing component. Any suitable oxidant capable of performing one or more of the above-noted functions may be employed. The oxidant is preferably selected from the group consisting of molecular oxygen (e.g. in the form of air, dilute or enriched air, or other mixtures with nitrogen or carbon dioxide), single oxygen, ozone, inorganic oxidant components containing oxygen and at least one second metal and mixtures thereof. More preferably, the oxidant is selected from the group consisting of molecular oxygen, oxidant components containing oxygen and at least one second metal and mixtures thereof. Still more preferably, the oxidant is oxygen. The oxidant can involve a mixture of oxidants such as an oxidant component containing oxygen and at least one second metal, and molecular oxygen in an amount effective to maintain the ortho-quinone containing component in the desired oxidized state and/or to oxidize at least a portion of the sulfur material in the coal and/or in the case of a reducible metal oxidant, to reoxidize such oxidant by, for example, molecular oxygen. Care should be exercised to avoid large excesses of the oxidant to as to minimize reactions that could solubilize deleterious elements, i.e., arsenic, etc.

The reducible second metal oxidants useful in the present invention may be chosen from a wide variety of materials. Preferably, the second metal is a metal which forms reducible metal oxides which are reduced during the conduct of the process of this invention. Many of the transition metals have this property. Typical examples of metals which have this property include minerals and other compounds which are generally solids under the condition of the process, such as, manganese, tin, lead, bismuth, germanium, antimony, indium and certain of the rare earth metals and minerals, e.g., cerium, praseodyminium and terbium and mixtures of rare earth minerals which typically have varying ratios of lanthanum, cerium, etc. Such reducible second metal components are preferably capable of becoming at least partially reduced at the present contacting conditions to form a reduced second metal component.

Manganese is a more preferred second metal. In one embodiment, the reducible manganese component includes manganese in the 4+ oxidation state. One particularly useful reducible manganese component is manganese (manganic) dioxide and its pyrolusite, manganite, birnessite and manganese-bearing minerals from the spinel group. In the above embodiment, it is preferred to have present molecular oxygen during processing. The latter system provides substantially soluble components for recovery of metal.

The present contacting results in at least a portion of the ortho-quinone containing component being chemically reduced to form a reduced catechol containing component. This reduced component can exit the contacting zone and be separated from the coal, in particular the contacted coal, i.e., partial to substantial separation. This component can be used on a once-through basis, or may be regenerated to an ortho-quinone containing component as set forth above, in situ or externally and recycled to the contacting zone. In the case of a once-through basis, it is preferred to minimize the amount of reduced component exiting with the coal. Such regeneration can be done by oxidizing the reduced component or with molecular oxygen, in situ or external, at ambient and/or elevated temperatures to convert the reduced component to an ortho-quinone containing component.

The amount of oxidant employed in the present invention is chosen to facilitate the desired functioning of the present contacting step. Although the ortho-quinone containing component takes an active part in the oxidation, when oxidant is employed, such ortho-quinone containing component preferably acts as a catalyst or promoter and may be, and preferably is, used more than once in the present contacting step, e.g., is recycled to the present contacting step or is employed to contact more than one increment of the coal.

The amount of oxidant employed preferably acts to facilitate the desired oxidation of the reduced ortho-quinone containing component and optionally at least a portion of the sulfur material from the coal. The specific amount of oxidant employed varies depending on many factors, for example, the specific coals being treated, the specific ortho-quinone containing component and oxidant being employed, and the specific degree of oxidation and sulfur liberation desired. If a reducible second metal oxidant is used, it preferably is used in an amount in the range of about 0.1% or less to about 10% or more to about 150% by weight of the pyritic sulfur and/or organic sulfur content of coal. Preferably, the amount of oxidant employed in the present contacting step should be sufficient to provide the oxidation to the desired degree. Substantial excesses of additional oxidant should be avoided since such excesses may result in materials separation and handling problems.

Although one or more of the oxidants may be utilized in a separate oxidation or regeneration step, it is preferred that such oxidants, and in particular oxygen, be present and effective during the contacting step of the present invention.

The contacting of the present invention takes place at a temperature and pressure and for a time sufficient to obtain the desired results. A combination of temperature and pressure effective to maintain water (the aqueous medium) in the liquid state is preferred. In one embodiment, temperatures of about 20° to about 140° C. with temperatures in the range of about 20° C. to about 110° C. and in particular between about 23° C. to about 60° C. being especially useful. Contacting pressure may be in the range of about atmospheric to about 500 psia or more. Pressures in the range of about atmospheric to about 100 psia have been found to provide satisfactory results.

Contacting times vary widely depending, for example, on the mode in which the contacting is performed. Such contacting time may range from minutes to weeks. For example, if the contacting occurs in a stirred tank with the coal present in a slurry with the aqueous medium and the ortho-quinone containing component, the contacting time preferably is in the range of about 0.1 hours to about 60 hours, more preferably about 1 hour to about 24 hours.

The present process may be conducted on a batch or continuous basis in a vat, tank or other suitable arrangement. The primary criterion for the contacting step is that the desired sulfur material oxidation takes place. Preferably, the coal and the ortho-quinone containing component are brought together to form an intimate admixture generally with the aqueous composition. The coal is preferably subjected to particle size reduction, e.g., by crushing, grinding, milling and the like, prior to contacting to render the coal more easily and/or effectively processed in the present contacting step. Air or other gaseous oxidant may be dispersed through, or otherwise contacted with, this admixture during the contacting step to achieve the desired result. Amounts of acid and/or base and/or can be added to the initial admixture and/or may be added during the contacting to provide the desired pH.

The pH of the aqueous liquid medium may be adjusted or maintained during the contacting step, for example, by adding one or more basic components to the aqueous liquid medium. Any suitable basic component or combination of such components may be included in, or added to, this medium to provide the desired basicity. For example, basic alkali metal and alkaline earth metal components, e.g., hydroxides, silicates, carbonates and bicarbonates, mixtures thereof and the like may be employed. Because of cost, availability and performance considerations, calcium hydroxide, sodium hydroxide, and mixtures thereof, particularly sodium hydroxide, are preferred.

The coal remaining after the contacting step may be subjected to any suitable coal recovery processing step or steps as set forth above. More particularly, the various processing steps set forth above for treatment of coal and/or oxidized sulfur material can be practiced with the above process for contacting coal with an ortho-quinone component and recovering a lower sulfur coal. For example, the various process embodiments such as thiophenic sulfur reduction, the use of conditioning agents, the use of coal aggregating agents and the like can be practiced in association with the ortho-quinone coal contacting process set forth above.

While the present invention has been described with respect to various specific examples and embodiments, it is to be understood that the invention is not limited thereto and that it can be practiced within the scope of the following claims.

What is claimed is:

1. A process for reducing the sulfur content of coal containing metal pyrites and organic sulfur comprising: contacting said coal with at least one vanadium component in which vanadium is present in the +5 oxidation state effective to promote the oxidation of said metal pyrites and organic sulfur at conditions including a temperature of less than about 100° C. effective to oxidize at least a portion of said metal pyrites and said organic sulfur in said coal and form an oxidized sulfur-containing coal said contacting occurring in the presence of $Cu^{++}$ ion in an amount sufficient to promote the oxidation of organic sulfur and at least one reducible manganese component in an amount effective as a vanadium oxidant to provide at least one of the following: (A) maintain said vanadium component and (B) produce at least a portion of said vanadium component and at least one additional added oxidant effective to oxidize a reduced manganese component to produce reducible manganese component, the total amount of said reducible manganese component and said vanadium component present being less than the molar stoichiometric amount needed to fully oxidize the organic sulfur and metal pyrites in said coals; reducing the metal pyrites and organic sulfur content of said oxidized sulfur-containing coal; and recovering a coal product having a reduced metal pyrites and organic sulfur content.

2. A process for reducing the sulfur content of coal containing metal pyrites and organic sulfur comprising: contacting said coal with at least one vanadium component in which vanadium is present in an amount in the +5 oxidation state effective to promote said oxidation of said metal pyrites and organic sulfur including both nonthiophenic and thiophenic sulfur said contacting occurring in the presence of at least one reducible manganese component, said reducible manganese component being in an amount effective as a vanadium oxidant to provide at least of the following: (A) maintain said vanadium component and (B) produce at least a portion of said vanadium component, and at least one additional added oxidant effective to oxidize a reduced manganese component to produce reducible manganese component, the total amount of said reducible manganese component and said vanadium component present being less than the molar stoichiometric amount needed to fully oxidize the metal pyrites and organic sulfur in said coal said contacting occurring at conditions effective to oxidize at least a portion of said metal pyrites and said nonthiophenic and thiophenic organic sulfur in said coal and form an oxidized sulfur containing coal; reducing the metal pyrites and organic nonthiophenic and thiophenic sulfur content of said oxidized sulfur-containing coal; and recovering a coal product having reduced metal pyrites and organic sulfur contents.

3. A process for reducing the sulfur content of coal containing metal pyrites and organic sulfur comprising: contacting said coal with at least one or more added plant derived aromatic component having ortho-quinone functionality at conditions effective to oxidize at least a portion of at least one of said sulfur components from said metal pyrites and organic sulfur, reducing the sulfur content of said oxidized sulfur-containing coal; and recovering a coal product having a reduced sulfur content.

4. The process of claim 3 wherein the plant derived aromatic component is selected from the group consisting of lignin and tannin.

5. The process of claim 4 wherein the plant derived aromatic component is lignin.

6. The process of claim 4 wherein the plant derived aromatic component has one or more water solubilizing groups selected from the group consisting of sulfonate salts, phenolate salts and carboxylate salts.

7. The process of claim 6 wherein the plant derived aromatic component is selected from the group consisting of a sodium lignosulfonate and a sodium lignin.

8. The process of claim 7 wherein the plant derived aromatic component is a sodium ligno sulfate.

9. The process of claim 3 wherein the ortho-quinone functionality is present in the component in the range of from at least about 1 weight percent to about 40 weight percent of the total weight of the plant derived aromatic component.

10. The process of claim 5 wherein the ortho-quinone functionality is present in the component in the range of from at least about 2 weight percent to about 30 weight percent of the total weight of the plant derived aromatic units.

11. The process of claim 7 wherein the ortho-quinone functionality is present in the component in the range of from at least about 2 weight percent to about 30 weight percent of the total weight of the plant derived aromatic units.

12. The process of claim 3 wherein said plant derived aromatic component is present in an aqueous soluble catalytic amount to at least promote the oxidation of at least one of said sulfur components and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

13. The process of claim 8 wherein said plant derived aromatic component is present in an aqueous soluble catalytic amount to at least promote the oxidation of at least one of said sulfur components and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

14. The process of claim 11 wherein said plant derived aromatic component is present in an aqueous soluble catalytic amount to at least promote the oxidation of at least one of said sulfur components and an additional oxidant is present to provide at least one of the following: (1) form and cycle said plant derived aromatic component between ortho-quinone and catechol oxidation states and (2) cycle said plant derived aromatic component between ortho-quinone and catechol oxidation states.

15. The process of claim 12 wherein the oxidant is oxygen and the contacting is in the presence of an aqueous medium at a pH in the range of from about 9 to about 13.

16. The process of claim 13 wherein the oxidant is oxygen and the contacting is in the presence of an aqueous medium at a pH in the range of from about 9 to about 13.

17. The process of claim 14 wherein the oxidant is oxygen and the contacting is in the presence of an aqueous medium at a pH in the range of from about 9 to about 13.

18. The process of claim 4 wherein the ortho-quinone functionality is present in the component in the range of from at least 5 weight percent to about 25 weight percent of the total weight of the plant derived aromatic unit.

19. The process of claim 7 wherein the ortho-quinone functionality is present in the component in the range of from at least 5 weight percent to about 25 weight percent of the total weight of the plant derived aromatic unit.

20. The process of claim 16 wherein the ortho-quinone functionality is present in the component in the range of from at least 5 weight percent to about 25 weight percent of the total weight of the plant derived aromatic unit.

* * * * *